United States Patent [19]

Mani

[11] 4,449,358

[45] May 22, 1984

[54] METHOD AND APPARATUS FOR PROMOTING A SURGE CONDITION IN A GAS TURBINE

[75] Inventor: Ramani Mani, Scotia, N.Y.

[73] Assignee: General Electric Company, Schenectady, N.Y.

[21] Appl. No.: 286,431

[22] Filed: Jul. 24, 1981

[51] Int. Cl.³ .............................................. F02C 9/28
[52] U.S. Cl. .................................. 60/39.02; 60/39.25; 60/39.281
[58] Field of Search ............ 60/39.28 R, 39.25, 39.02

[56] References Cited

U.S. PATENT DOCUMENTS 3,002,349 10/1961 Arnett et al. .................. 60/39.28 R
3,006,144 10/1961 Arnett et al. .................. 60/39.28 R
3,053,047 9/1962 Bodemuller .................... 60/39.28 R

OTHER PUBLICATIONS

J. A. Webb, Jr., Oral Mehmed & Carl F. Lorenzo, "Single-Stage Electrohydraulic Servosystem for Actuating an Airflow Valve with Frequencies to 500 Hertz", NASA Technical Paper 1678, Aug. 1980.
E. M. Grietzer, "Surge and Rotating Stall in Axial Flow Compressors; Part I: Theoretical Compression System Model, "Transactions of the ASME, J. Engrg. for Power, vol. 98, No. 2, Apr. 1976, pp. 190-198.
E. M. Grietzer, "Surge and Rotating Stall in Axial Flow Compressors; Part II: Experimental Results & Comparison with Theory", Transactions of the ASME, J. Engrg. for Power, vol. 98, No. 2, Apr. 1976, pp. 199-217.
S. Drabek, "Stall Control", Symposium on Compressor Stall, Surge, and System Response, presented at the Joint Conference of the ASME, Gas Turbine & Hydraulic Divs., held in Houston, Texas, Mar. 6-9, 1960, pp. 23-26.

*Primary Examiner*—Louis J. Casaregola
*Attorney, Agent, or Firm*—Charles E. Bruzga; James C. Davis, Jr.; Marvin Snyder

[57] ABSTRACT

A surge condition in a stalled gas turbine engine is promoted by modulating a time-varying component of an operating parameter of the gas turbine engine, such as the fuel flow to the combustor plenum of the engine, substantially in phase with a time-varying component of the pressure in the combustor plenum, thereby allowing normal operation of the engine to resume during the surge condition by eliminating the stall-inducing agent.

38 Claims, 20 Drawing Figures

METHOD AND APPARATUS FOR PROMOTING A SURGE CONDITION IN A GAS TURBINE

BACKGROUND OF THE INVENTION

The present invention relates to the recovery from stall of a gas turbine engine, and, more particularly, to a method and apparatus for promoting a surge condition in such a stalled engine, during which surge condition the stall-inducing agent can be eliminated and the engine can thus resume normal operation.

A typical gas turbine has an inlet portion for drawing in ambient air. Such air is thereupon compressed by an axial flow compressor and passed to further stages of the gas turbine engine. While the air is being compressed in the compressor, it normally has an unseparated flow pattern throughout the length of the compressor. Various stall-inducing agents, however, such as an abrupt increase in fuel flow to the combustor, can result in material disruption of such an unseparated flow pattern whereby a separated flow pattern, characterized by a high degree of turbulence, is created. The functioning of such a gas turbine engine subject to a stall-inducing agent is then said to be stalled. In such a condition, the output power of the engine falls off considerably. The post stall behavior of the engine can be characterized by either a surge condition or a non-surge condition. A "surge" condition is a post stall response in which an engine continually alternates between normal operation and stalled operation. A non-surge condition, on the other hand, is a condition in which the engine tends to operate in a rotating stall mode.

Difficulties can arise when a gas turbine engine becomes stalled and operates solely in a non-surge condition. A first difficulty is that of having to wait for the stalled gas turbine engine to regain normal power output while an operator of the engine causes the engine to go through shutdown and restart modes. The duration of this wait can be dangerously long where a stalled engine constitutes the propulsion means for an aircraft.

A further difficulty of a stalled gas turbine engine operating in a non-surge condition is that it may become overheated and cause damage to the turbine stage thereof. Such overheating can occur because the compressor of a stalled gas turbine engine draws in much less air than normal through the inlet portion of the engine. Meanwhile, the combustor stage of the engine can continue to add a large amount of heat to the now diminished flow of air that passes therethrough. Consequently, a large and destructive amount of heat can be imposed on the turbine stage of a stalled gas turbine engine.

It has been recognized in the prior art that the presence of a surge condition following stall initiation in a gas turbine engine is desirable because the responsible stall-inducing agent can be eliminated during the surge condition, thereby enabling the engine to readily assume normal operation. See for example, E. M. Greitzer, "Surge and Rotating Stall in Axial Flow Compressors; Theoretical Compression System Model", Transactions of the ASME, J. Engrg. for Power, Vol. 98, No. 2, April 1976, pp. 190-198, at 190. However, the prior art as indicated, for example, in the foregoing article teaches that the promotion of a surge condition in a stalled engine falls within the ambit of the engine designer. While engine design certainly can help to ensure that a surge condition will exist in a stalled engine, it would be desirable to provide a method and apparatus for promoting a surge condition in a stalled engine which is effective in any type of engine design. Such a method and apparatus could be incorporated in existing gas turbine engines by retrofitting the engines.

OBJECTS OF THE INVENTION

Accordingly, it is an object of the present invention to provide a method and apparatus for promoting a surge condition in a stalled gas turbine engine.

It is a further object of the invention to provide a method and apparatus for promoting a surge condition in a stalled gas turbine engine which method and apparatus can be implemented in existing engines by retrofitting the engines.

A still further object of the present invention is to provide a method and apparatus for promoting a surge condition in a stalled gas turbine engine which method and apparatus is calculated to minimize the structural stress imposed on the gas turbine engine by the surge condition.

Further objects and advantages of the present invention will become apparent from a reading of the remainder of the specification.

SUMMARY OF THE INVENTION

In carrying out the objects of the present invention a method of promoting a surge condition in a stalled gas turbine engine comprises the steps of monitoring the pressure of the combustor plenum of the gas turbine engine; determining an onset of a stall in the gas turbine engine; and modulating a time-varying component of a first operating parameter of the gas turbine engine substantially in phase with a time-varying component of the combustor plenum pressure, whereby a surge condition is promoted in the gas turbine engine.

In a preferred embodiment of the method, the amplitudes of the time-varying components of the first operating parameter and the combustor plenum pressure bear a predetermined relation to each other which is selected to substantially minimize structural stress imposed in the gas turbine engine due to the modulation of the first operating parameter.

Additionally, an apparatus for promoting a surge condition in a stalled gas turbine engine comprises means for monitoring the pressure of the combustor plenum of the gas turbine engine; means for determining an onset of a stall in the gas turbine engine; and means for modulating a time-varying component of a first variable parameter of the gas turbine engine substantially in phase with a time-varying component of the combustor plenum pressure, whereby a surge condition is promoted in the gas turbine engine.

In a preferred embodiment of the apparatus, the amplitudes of the time-varying components of the first operating parameter and the combustor plenum pressure bear a predetermined relation to each other which is selected to substantially minimize structural stress imposed in the gas turbine engine due to the modulation of the first operating parameter.

BRIEF DESCRIPTION OF THE DRAWING FIGURES

FIG. 18 is a block diagram illustrating an alternative amplifier to the amplifier shown in FIG. 9 for implementing a refined version of the present invention;

DETAILED DESCRIPTION OF THE INVENTION

Figure 1:
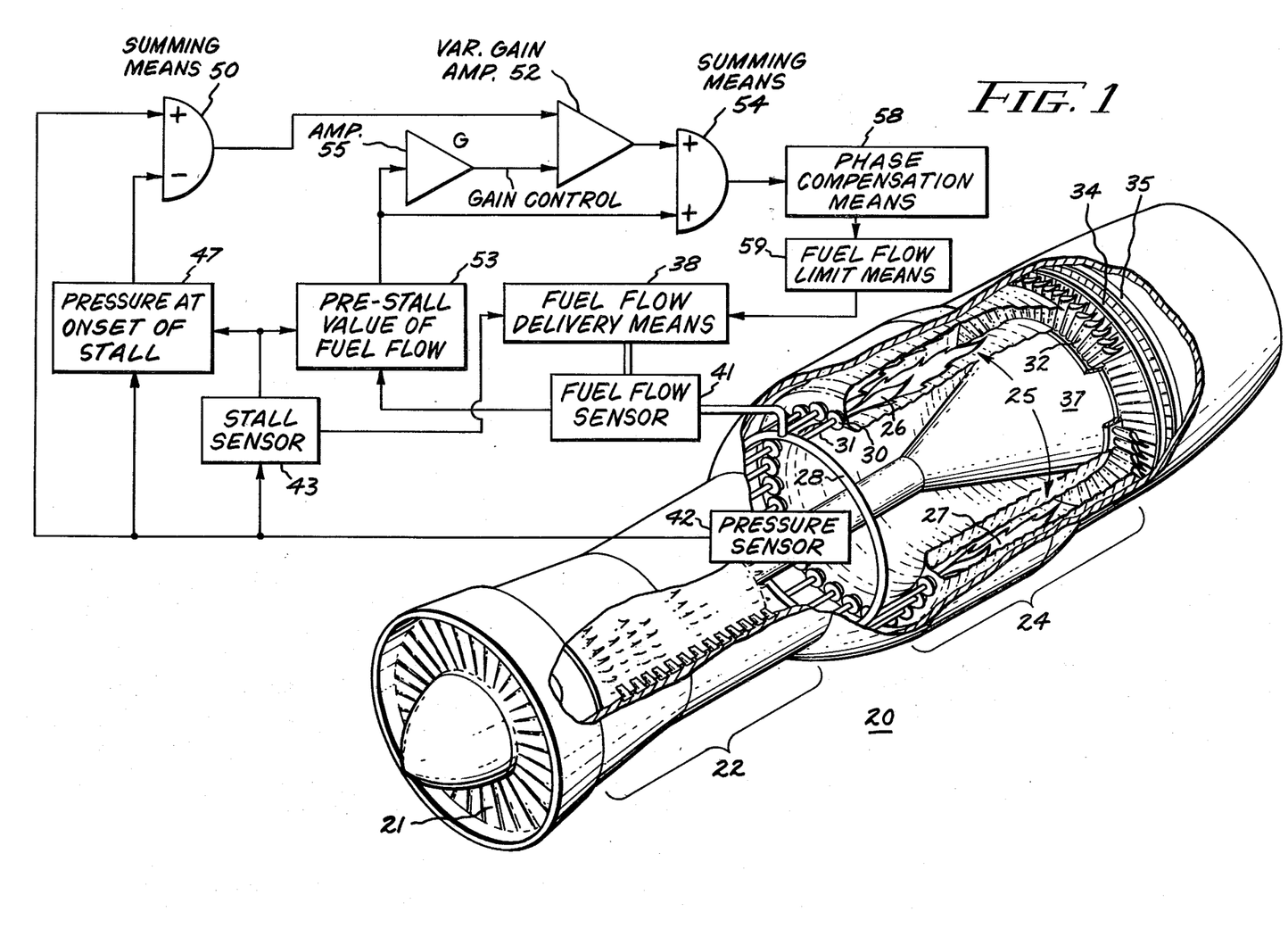
FIG. 1 is a simplied, perspective view, partially broken away, of one form of a gas turbine engine along with a block diagram of one means for implementing the present invention.

FIG. 1 shows a simplified view of one form of a gas turbine engine 20 along with a block diagram of one means for implementing the present invention. The gas turbine engine 20 has an inlet portion 21 which draws in ambient air. An axial flow compressor 22 compresses the air drawn in through the inlet portion 21 and directs it to a combustor plenum 24. The combustor plenum 24 comprises a combustion chamber 25 wherein fuel is burned as indicated by the flames 26 and 27. Fuel for combustion is supplied to fuel nozzles 30 through a fuel supply line 28 and connecting lines 31.

The burning fuel 26 and 27 serves to increase the temperature of the gas within the combustor plenum, which gas is thereupon directed through a turbine guide vane assembly 32. The turbine guide vane assembly 32 is formed in a ring pattern which is stationary relative to the longitudinal axis of the gas turbine engine 20. Rotating turbine blade assemblies 34 and 35 are connected to a turbine shaft 37 which, in turn, is connected to the central rotating element of the compressor 22 for implementing the operation thereof.

The block diagram of FIG. 1 illustrates one means for implementing the present invention. A fuel flow delivery means 38 supplies fuel to the fuel nozzles 30 through the fuel supply lines 28 and 31. The fuel flow delivery means 38 comprises, for example, a fuel pump controllable by an electric signal, and, as such, can suitably be a conventional apparatus. In the absence of a stall condition of the gas turbine engine 20, the fuel flow means 38 is controlled in a conventional manner to provide fuel to the fuel nozzles 30. However, after the onset of a stall in the engine 20, the fuel flow delivery means 38 is controlled by an electrical modulation signal, supplied by a fuel flow limit means 59, which modulation signal overrides the conventional control of fuel supplied to the nozzles 30. A fuel flow sensor 41 monitors the rate of fuel flow supplied to the fuel nozzles 30 (hereinafter simply "fuel flow").

The pressure within the combustor plenum 24 is monitored by a pressure sensor 42 which is suitably located in the engine 20 immediately downstream of the compressor 22. The pressure sensor 42 should have a frequency response up to approximately 10 kilohertz, at least for conventional aircraft engines such as specifically described herein, and should be resistant to temperatures encountered thereby. The pressure sensor 42 is suitably implemented by a Kulite XTE-1-190 series pressure sensor manufactured by Kulite Semiconductor Products, Inc. of Ridgefield, N.J. In order to sense the onset of a stall, a stall sensor 43 is provided and produces an electrical output signal after a sudden drop in the combustor plenum pressure as sensed by the pressure sensor 42. Stall sensors are currently known in the art and determine an onset of a stall by detecting an abrupt drop in combustor plenum pressure, or, alternatively, an increase in turbine gas temperature. A discussion of the foregoing ways of determining stall onset is provided in S. Drabek, "Stall Control", Symposium on Compressor Stall, Surge and System Response, presented at the Joint Conference of the ASME Gas Turbine Power and Hydraulic Divisions, held in Houston, Tex., Mar. 6–9, 1960, at pages 23–26, and incorporated herein by reference. For the purposes of the present invention it is not critical how a stall onset is determined, so long as it is determined. For the specific gas turbine engines discussed hereinafter, one possible suitable criterion for determining the onset of a stall is an abrupt drop in combustor plenum pressure comprising a drop of 10 percent in the value thereof in 5 milliseconds.

An electrical signal representing a time-varying component of the combustor plenum pressure is produced by a summing means 50. This time-varying signal is derived from the output of the pressure sensor 42 and the output of a means 47. The electrical signal from the means 47 comprises a time-constant component as opposed to a time varying component. As used herein, a "time-varying" component or signal comprises the complete time-varying fluctuations of the subject signal or value. A "time-varying" component or signal can, additionally, further comprise a time-constant component of the subject signal or value. The means 47 during stall stores and continually supplies to the negative input of the summing means 50 a time-constant signal representing the value of the combustor plenum pressure at the onset of a stall. The means 47 produces its output signal in response to a signal from the output of the stall sensor 43. The summing means 50 serves to remove a time-constant component from the signal produced by the pressure sensor 42 by subtracting therefrom the time-constant signal produced by the means 47. The output of the summing means 50 thus constitutes a signal representing a time-varying component of the combustor plenum pressure.

An electrical signal that is ultimately used in modulating the fuel flow when conventional control of the fuel flow delivery means 38 is overridden after the onset of a stall is derived from the time-constant output of a means 53 which is summed with the time-varying output of a variable gain amplifier 52 by a summing means 54. The means 53 monitors the output of the fuel flow sensor 41 and subjects this output to a delay which is longer than the time interval between the occurrence of a stall-inducing agent and the onset of a stall. Where a stall is determined in accordance with the criterion given above, a suitable delay is greater than about 25 milliseconds. At the onset of a stall, as sensed by the means 53 through the output of the stall sensor 43, the means 53 stores the delayed, or "pre-stall", value of the fuel flow and produces a time-constant output signal representing this value.

The variable gain amplifier 52 amplifies the time-varying signal from the summing means 50 by a gain which is determined by the output of an amplifier 55, coupled to a gain control input of the amplifier 52. The output signal of the amplifier 55 is proportional to the output signal of the means 53, representing the pre-stall value of fuel flow, and serves as a gain control signal for the variable gain amplifier 52. Thus, the time-varying signal produced by the amplifier 52 bears a predetermined relation of proportionality to the time-varying output signal of the summing means 50, representing the combustor plenum pressure, and to the pre-stall value of fuel flow. The gain, G, of the amplifier 55 determines the degree of proportionality between the output signal of the amplifier 52 (and, ultimately, the amplitude of the time-varying component of the modulated fuel flow) and the pre-stall value of fuel flow. A procedure for selecting a suitable value of G is discussed in depth below. The gain characteristic of the variable gain amplifier 52 is suitably chosen once the value of the gain, G, of the amplifier 55 is known, to provide a signal from the amplifier 52 representing fuel flow instead of combustor plenum pressure as represented by the output signal of the summing means 50.

The output signal of a summing means 54 that is ultimately used in modulating the fuel flow after the onset of a stall can be further processed by a phase compensation means 58 and, additionally, by a fuel flow limit means 59. The phase compensation means 58 comprises a phase-shift circuit which produces an output signal having a phase effectively advanced in time with respect to its input signal. Such a "phase effectively advanced in time" is meant to include both a phase lead and a phase lag somewhat less than a complete cycle of the fundamental frequency of its input signal. The effective advance in time is preferably selected to equal the delay between fuel flow and the ensuing heat release in the combustor plenum 24 (hereinafter, simply "heat release"). The phase compensation means 58 is desirably utilized when such delay is substantial relative to a cycle of the fundamental frequency of the output signal from the summing means 54. By "substantial delay" is meant more than about 20 percent of a fundamental frequency cycle of the output signal of the summing means 54. Where such delay is not substantial, use of the phase compensation means 58 is optional. However, where such delay is non-negligible (for example, more than about 5 percent of a fundamental frequency cycle of the output signal of the summing means 54), utilization of the means 58 desirably allows minimization of the gain factor, G, of the amplifier 55 (the importance of which is discussed below).

The fuel flow limit means 59 serves to limit the fuel flow to a rate that is preferably the same or substantially the same as the maximum rated fuel flow for the gas turbine engine 20. The purpose of limiting the fuel flow to such a maximum rated value is to prevent overheating of the engine 20. The fuel flow limit means 59 may suitably comprise a peak chopper circuit. Alternatively, the means 59 could be incorporated into the fuel flow delivery means 38, as is sometimes already done.

The electrical output signal produced by the fuel flow limit means 59 is used, after the onset of a stall in the engine 20, to modulate one of the variable parameters of the engine 20, either fuel flow or, alternatively, the heat release in the combustor plenum 24. In particular, the time-varying component of the fuel flow is modulated substantially in phase with the time-varying component of the output signal of the fuel flow limit means 50. As used herein, a first time-varying signal is "substantially in phase" with a second time-varying signal when a fundamental frequency portion of the first time-varying signal is within plus or minus 90 degrees of being exactly in phase with a fundamental frequency portion of the second time-varying signal. If the phase compensation means 58 is not utilized, it can be said that the time-varying component of the fuel flow is modulated substantially in phase with the time-varying component of the combustor plenum pressure, since the output signal of the fuel flow limit means 59 represents the combustor plenum pressure (except to the extent that its magnitude is limited by the fuel flow limit means 59). If the phase compensation means 58 is utilized to compensate for the delay between fuel flow and heat release, or, if the delay between fuel flow and heat release is not substantial (as defined above), it can be said that the time-varying component of the heat release is modulated substantially in phase with the time-varying component of the combustor plenum pressure, since the output signal of the fuel flow limit means 59 represents the combustor plenum pressure (except to the extent that its magnitude is limited by the fuel flow limit means 59 and to the extent that its phase is altered by the phase compensation means 58).

Figure 2:
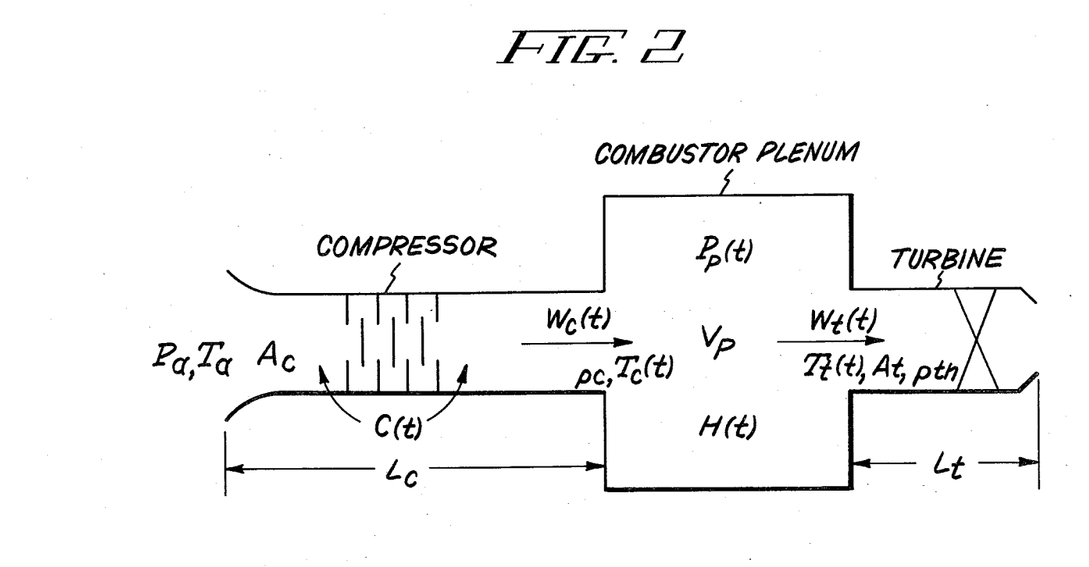
FIG. 2 is a schematic representation of a gas turbine engine.

The value of the predetermined gain, G, of the amplifier 55 is suitably determined to a high degree of accuracy from the following analysis of the operation of the gas turbine engine 20. Turning to FIG. 2, there is shown a schematic representation of a simplified or idealized model of a gas turbine engine "system" having "lumped" volumes for the compressor, the combustor plenum, and the turbine stages. In the lumped volume model of FIG. 2, the compressor is shown as embedded in a duct of length $L_c$ and cross-sectional area $A_c$, followed by a combustor plenum of volume $V_p$. The combustor plenum is followed by a turbine having a cross-sectional throat area of a turbine guide vane assembly of $A_t$. The foregoing and the other nomenclature used in FIG. 2, as well as nomenclature used below, are defined as follows:

NOMENCLATURE $A_c$ = cross-sectional area of the compressor
$A_t$ = cross-sectional throat area of turbine guide vane assembly
B = a non-dimensional value defined as $$\frac{M_t}{2}\sqrt{\frac{V_p}{A_c L_c}}$$

C(t) = instantaneous pressure rise produced by the compressor
$C_{ss}(W_c)$ = steady state pressure rise produced by the compressor for both stalled and unstalled modes $C_p$ = specific heat of gas flowing through the engine at constant pressure $F$ = a non-dimensional value defined as $$\frac{L_t A_c}{A_c L_c}$$

$H(t)$ = instantaneous heat release in the combustor plenum from the burning of fuel $K$ = non-dimensional constant to account for the pressure drop due to friction occasioned by the liner of the combustor plenum $L_c$ = length of compressor duct $L_t$ = length of turbine duct $M_t$ = compressor wheel tip Mach#

$P_a$ = pressure of ambient atmosphere $P_p(t)$ = instantaneous pressure in the combustor plenum $P_p(o)$ = pressure in combustor plenum before the occurrence of a stall-inducing agent $Q$ = critical pressure ratio $R$ = gas constant $T_a$ = ambient temperature $T_c$ = temperature at compressor exit $T_c(o)$ = temperature at compressor exit before the occurrence of a stall-inducing agent $T_t(t)$ = instantaneous turbine inlet temperature $V_p$ = volume of combustor plenum $W_c(t)$ = instantaneous weight flow rate through the compressor $W_t(t)$ = instantaneous weight flow rate through the turbine $\gamma$ = specific heat ratio of gas flowing through the engine $\rho_c$ = density of gas at compressor exit $\rho_{th}$ = density of gas in the throat region of turbine guide vane assembly $\tau$ = a time constant; for unstalled operation $\tau = 0$, and for stalled operation $\tau$ is an experimentally determined constant

SUBSCRIPTS a = ambient
c = compressor
ss = steady state value when engine not in stall mode
t = turbine
th = throat The instantaneous dynamic state of the gas turbine engine system shown in FIG. 2 can be characterized by the five "dependent" quantities, $W_c(t)$, $C(t)$, $P_p(t)$, $T_t(t)$, and $W_t(t)$. The values of the foregoing five quantities are determined by simultaneously solving five differential equations which express various relations amongst the five quantities. Five suitable differential equations are set forth below. The expressions of the five differential equations are simplified by using the following explicit defining relations:

$$\frac{(T_c - T_c(o))}{T_a} = \left(\frac{P_p}{P_a}\right)^{\frac{\gamma-1}{\gamma}} - \left(\frac{P_p(o)}{P_a}\right)^{\frac{\gamma-1}{\gamma}}$$

$$\rho_c = (P_p/(RT_c))$$

The first equation is a momentum equation for the compressor duct and can be expressed as follows:

$$\frac{L_c}{A_c} \frac{dW_c}{dt} = -\left(P_p - P_a + \frac{KW_c^2}{2\rho_c A_c^2}\right) + C$$

The second equation is a semi-empirical lag equation concerning the pressure rise produced by the compressor and is expressed as follows:

$$\tau \frac{dC}{dt} + C = C_{ss}(W_c)$$

The third equation is an energy balance equation for the combustor plenum and is expressed as follows:

$$\frac{V_p}{\gamma - 1} \frac{dP_p}{dt} W_c C_p T_c - W_t T_t C_p + H(t)$$

The fourth equation takes into account the continuity or mass balance of the combustor plenum and also the energy balance of the combustor plenum and is expressed as follows:

$$\frac{V_c P_p}{C_p(\gamma - 1)} \left\{ \frac{1}{T_c^2} \frac{1}{T_t^2} \right\} \frac{dT_t}{dt} =$$

$$W_c \left(1 - \frac{2}{\gamma} + \frac{T_c}{T_t}\right) - W_t \left(1 - \frac{2}{\gamma} + \frac{T_t}{T_c}\right) +$$

$$\frac{H(t)}{C_p} \left\{ \frac{1}{T_c} + \frac{1}{T_t} \right\}$$

The fifth equation is an energy equation for the turbine duct with the turbine guide vane assembly "choked" (that is, the air flow velocity through the throat of the turbine guide vane assembly is greater than sonic velocity) and is expressed as follows:

$$Q = \left(\frac{\gamma + 1}{2}\right)^{\frac{\gamma}{\gamma - 1}}$$

$$\rho_{th} = \frac{\gamma P_p}{(\gamma - 1)C_p T_t \left(\frac{\gamma + 1}{2}\right)^{\frac{1}{\gamma - 1}}}$$

$$\frac{W_t^2}{2\rho_{th} A_t^2} = \left(\frac{\gamma}{\gamma - 1}\right) P_p \left\{ \left(\frac{1}{Q}\right)^{\frac{1}{\gamma}} - \frac{1}{Q} \right\}$$

In solving the foregoing five differential equations, the gas turbine engine system of FIG. 2 is first considered in a steady state operating mode. In this mode, the geometric quantities $L_c$, $A_c$, $V_p$, $A_t$, and $L_t$ must be specified. These quantities can be made time dependent, and this fact will be made use of in conjunction with a further embodiment of the present invention as discussed below. In the steady state operating mode, initial values of $W_c(t)$, $C(t)$, $P_p(t)$, $T_t(t)$, and $W_t(t)$ that correspond to an operating point of the system prior to the occurrence of a stall-inducing agent must be specified. Additionally, in the steady state operating mode, the following gas turbine engine parameters must be specified:

- At 100% speed, tubrine wheel speed (which determines $W_c$)
- At 100% speed, ratio of steady state compressor discharge temperature ($T_c$ in °R.) to steady state ambient temperature ($T_a$ in °R.)
- At 100% speed, ratio of steady state turbine inlet temperature ($T_t$ in °R.) to steady state ambient temperature ($T_a$ in °R.)
- Steady state compressor characteristics (pressure ratio versus weight flow rate) both in stalled and unstalled modes ($C_{ss}(W_c)$)
- Instantaneous heat release in the combustor plenum ($H(t)$)
- Amplitude and duration of the relevant, worst case stall-inducting agent; e.g., loss of stall margin due to inlet distortion (that is, ($C_{ss}(W_c)$) changed in value). (As used herein, "relevant" means the most likely type of stall-inducing agent, and "worst case" means the maximum severity of the stall-inducing agent. These parameters would typically be user-specified, depending on the intended usage of a gas turbine engine).

The correspondence between the foregoing parameters and the above five equations will be obvious to those skilled in the art. Each of the foregoing parameters can be made time dependent and, in accordance with a first embodiment of the present invention, the instantaneous heat release in the combustor plenum, $H(t)$, is made time dependent.

With the foregoing geometric quantities and engine parameters specified, the five differential equations set forth above are suitably solved through the use of the Adams predictor-corrector method, which is well known in the art. FIGS. 3-8 are graphs illustrating selected parameters of the gas turbine engine system of FIG. 2. These graphs are based upon the simultaneous solving of the above five differential equations for a specific gas turbine engine having the following parameters:

- At 100% speed, a turbine wheel speed corresponding to a wheel tip Mach#($M_t$) of 1
- At 100% speed, ratio of steady state compressor discharge temperature ($T_c$ in °R.) to steady state ambient temperature ($T_a$ in °R.): 1.93
- At 100% speed, ratio of steady state turbine inlet temperature ($T_t$ in °R.) to steady state ambient temperature ($T_a$ in °R.): 6
- At 100% speed, compressor stalling total pressure ratio: 8.441
- Steady state compressor characteristics (pressure ratio versus weight flow rate) both unstalled and in stall: Dashed lines 60 and 61, respectively, in FIG. 5.
- Amplitude and duration of relevant, worst case stall-inducing agent: decrease of turbine nozzle throat area of 7 percent (this assumes, of course, that the subject gas turbine engine has a variable turbine nozzle throat area, such as discussed in depth below with reference to the gas turbine engine of FIG. 9).

The geometric quantities $L_c$, $A_c$, $V_p$, $A_t$, and $L_t$ such that the non-dimensional quantities:

$$B = \frac{M_t}{2} \sqrt{\frac{V_p}{A_c L_c}} = 0.4, \text{ and } F = \frac{L_t A_c}{A_t L_c} = 0.36$$

A study of these graphs will indicate how to select a suitable value for the predetermined gain, G, of the amplifier 55.

Figure 3:
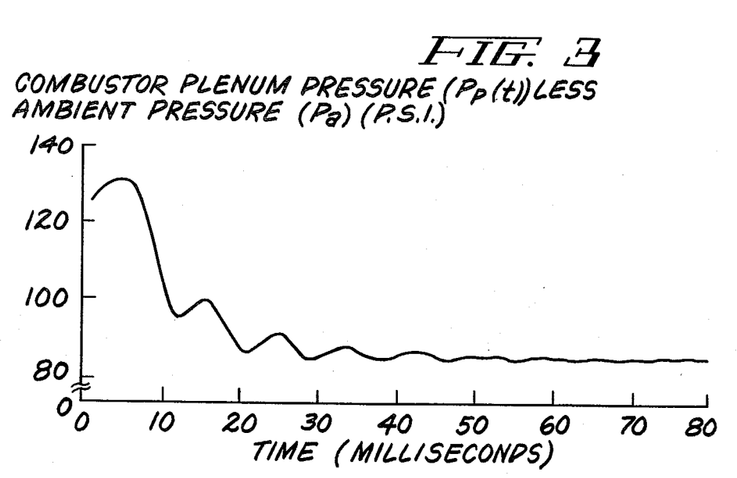
FIGS. 3–5 are graphs of various parameters of a gas turbine engine that does not utilize the present invention and that consequently goes into a non-surging stall mode after the onset of a stall.
Figure 4:
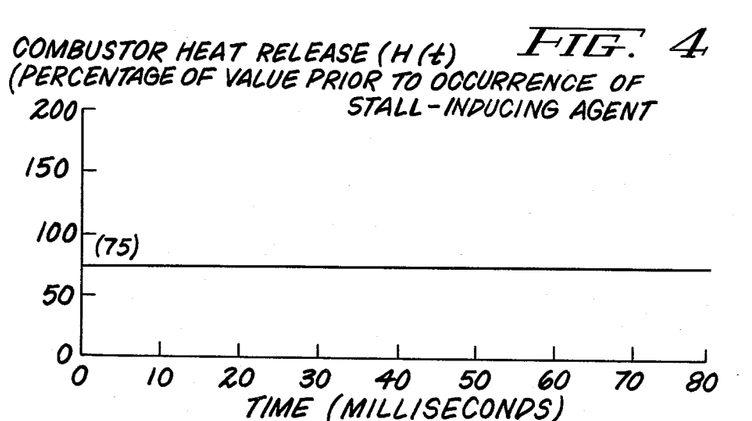
Figure 5:
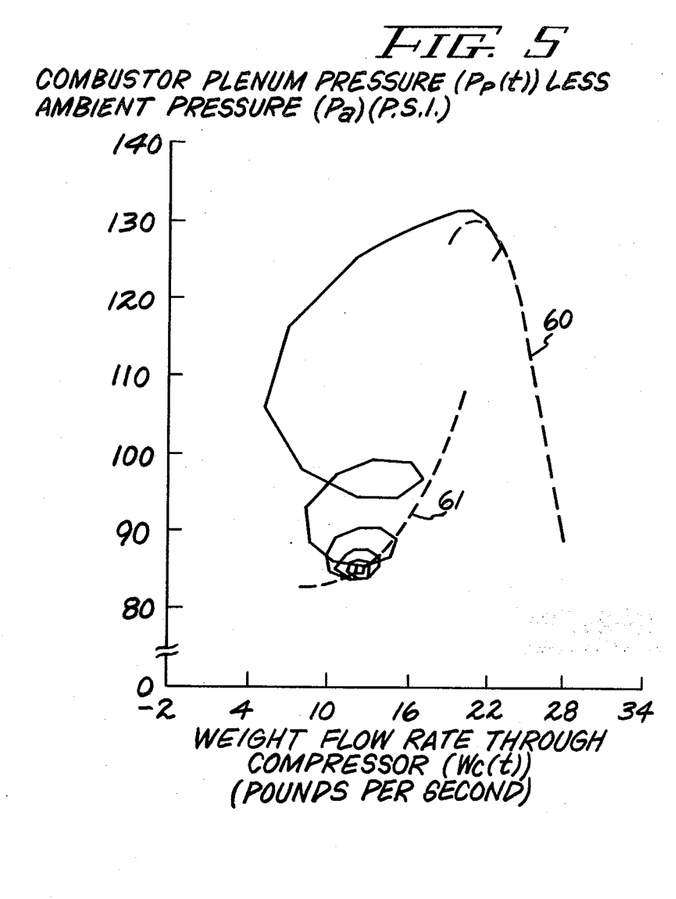

To put the operation of the present invention into a sharper focus, FIGS. 3-5 illustrate the outcome of a stalled gas turbine engine system which does not utilize the present invention.

FIG. 3 shows the quantity, Combustor Plenum Pressure ($P_p(t)$) Less Ambient Pressure ($P_a$) (hereinafter, simply "Pressure") versus Time after the occurrence of a stall-inducing agent at time "0". This makes the onset of a stall, using the criterion set forth above, happen at about 10 milliseconds. It can be seen that the Pressure goes through several highly damped oscillations and then essentially assumes a constant value after about 60 milliseconds. Such behavior of the Pressure indicates engine operation in a rotating stall, non-surge condition. This type of stall often constitutes a non-recoverable stall.

FIG. 4 shows the quantity Combustor Heat Release ($H(t)$) (hereinafter, simply "Heat Release") versus Time after the occurrence of a stall-inducing agent at time "0". After time "0", the Heat Release has been dropped to 75 percent of its existing prior to the occurrence of a stall-inducing agent. This is a conventional corrective action (not discussed above) designed to alleviate a stall condition. However, the gas turbine engine system enters into a non-recoverable stall condition notwithstanding such corrective action.

FIG. 5 illustrates the quantity Combustor Plenum Pressure ($P_p(t)$) Less Ambient Pressure ($P_a$) ("Pressure") versus Weight Flow Rate through Compressor ($W_c(t)$) (hereinafter, simply "Weight Flow Rate") and corresponds to engine operation in accordance with FIGS. 3 and 4. The solid line curve in FIG. 5 represents the performance of the compressor. The dashed line 60 represents the steady state, unstalled compressor characteristic, $C_{ss}(W_c)$, and the dashed line 61 represents the steady state, stalled compressor characteristic $C_{ss}(W_c)$. The performance curve of the compressor initially is in accordance with the steady state, unstalled compressor characteristic 60, but a stall-inducing agent causes it to circle in a counter-clockwise fashion until it settles on the steady state, stalled compressor characteristic 61. This type of performance curve for the compressor is another way of illustrating engine operation in a non-surging or non-recoverable stall.

Figure 6:
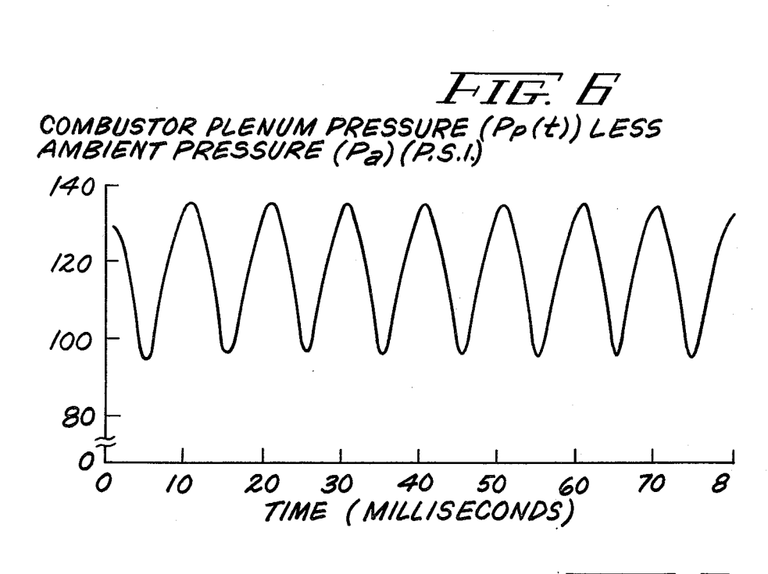
FIGS. 6–8 are graphs illustrating various parameters of a gas turbine engine that goes into a stall mode wherein a surge condition is promoted in accordance with the present invention.
Figure 7:
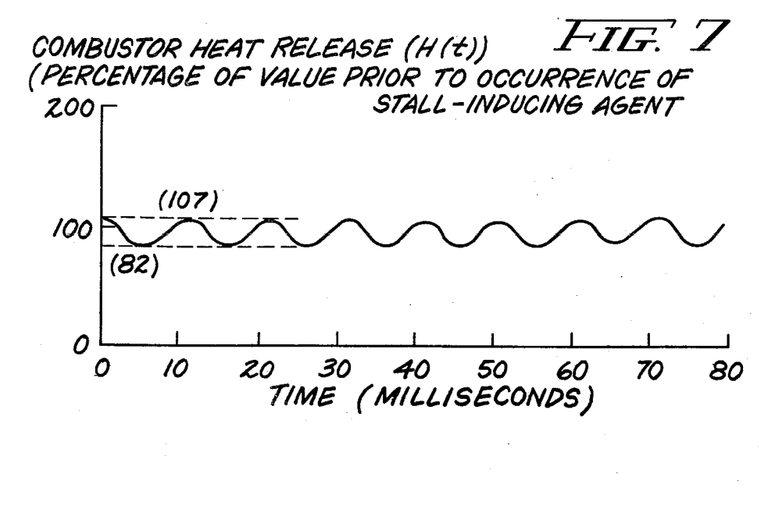
Figure 8:
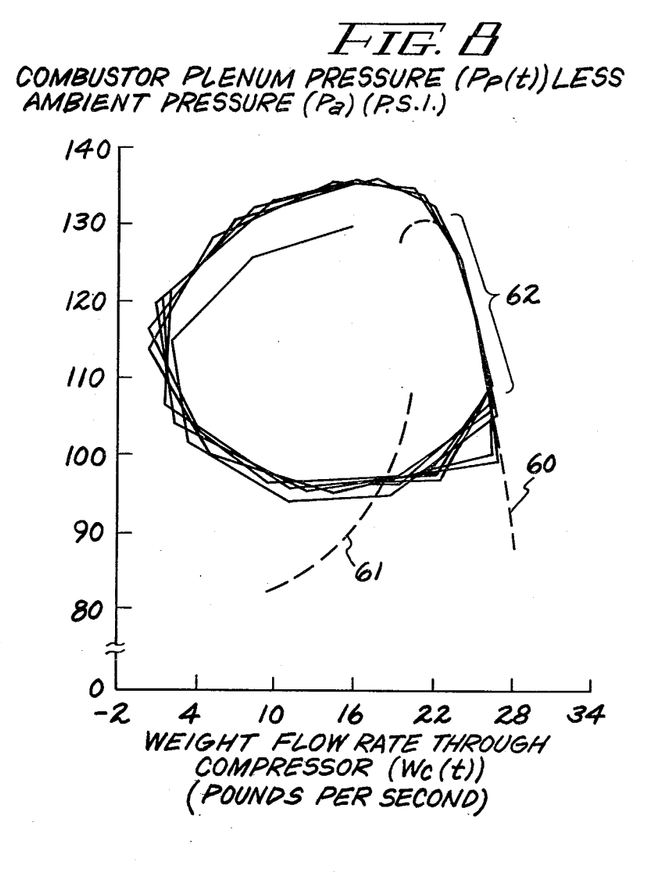

The graphs of FIGS. 6-8 illustrate the operation of a first embodiment of the present invention which is implemented by the means represented by the block diagram of FIG. 1. In FIG. 6, it can be seen that the Combustor Plenum Pressure ($P_p(t)$) Less Ambient Pressure ($P_a$) (hereinafter, simply "Pressure") initially drops in value in the time interval between 0 and 5 milliseconds on the Time scale. The onset of a stall occurs in this time interval, using the criterion for stall set forth above. In accordance with the present invention, the time-varying component of the Combustor Heat Release ($H(t)$) ("Heat Release") in FIG. 7 is modulated substantially in phase with the time-varying component of the Pressure of FIG. 6, or, equivalently with the time-varying component of the Combustor Plenum Pressure, since the Ambient Pressure ($P_a$) is typically constant. For the specific gas turbine engine identified by the parameters set forth above, the Heat Release is modulated to vary between 82 and 107 percent of its value prior to the occurrence of the stall-inducing agent which precipitated engine stall. Heat Release comprises a time-varying component and a time-constant component. The time-constant component is suitably chosen to be 100 percent of the value of Heat Release prior to the occurrence of the stall-inducing agent. However, the time-constant component could alternatively have other values that are preferably within about 25 percent of the value prior to the occurrence of the stall-inducing agent. This preferred limitation on the value of the time-constant component of the Heat Release is designed to prevent a drastic change in Heat Release from acting as a stall-inducing agent.

In FIG. 6, it can be seen that the Pressure continues to oscillate rather than decay very quickly, as was the case in FIG. 3. FIG. 8 illustrates the Combustor Pressure ($P_p(t)$) Less Ambient Pressure ($P_a$) ("Pressure") versus Weight Flow Rate through Compressor ($W_c(t)$)0 ("Weight Flow Rate"). The solid line curve in FIG. 8, illustrating compressor performance, starts on the steady state, unstalled compressor characteristic 60 and then rotates in a counter-clockwise fashion for several complete revolutions or cycles. During each such cycle, the solid line curve coincides for a period of time with the steady state, unstalled compressor characteristic 60 in a region 62. In other words, the gas turbine engine system of FIG. 2 continues to go through cycles with part of each cycle defining normal operation of the gas turbine engine system. This is known as a surge condition, or an alternation between stall and normal operation. It is highly desirable to have a surge condition during engine stall because the gas turbine engine can readily resume normal operation simply by the elimination of the stall-inducing agent. For the purposes of the present invention, it is not necessary that the compressor performance curve in FIG. 8 (i.e., the solid line curve) coincide in every cycle with the steady state, unstalled compressor characteristic 60 so as to define a surge condition. What is necessary is that the compressor performance curve eventually coincide during cycles with the characteristic 60 whereby a surge condition is eventually achieved. Of course, it is desirable that a surge condition be attained as quickly as possible consistent with avoiding the requirement of an unacceptably large amount of modulation of Heat Release lest the engine be subject to excessive structural stress.

In arriving at a suitable predetermined gain, G, for the amplifier 55 of FIG. 1, one should use a first function of time for H(t) corresponding to a first value of the predetermined gain, G, in the simultaneous solving of the five differential equations set forth above. Second and further functions of time for H(t) as necessary should then be used in predetermining a suitable value of the predetermined gain, G, for ensuring the eventual occurrence of a surge condition, as discussed above.

It is desirable to minimize the predetermined gain, G, in order to substantially minimize structural stress imposed on the gas turbine engine. Accordingly, different values of H(t) should be used in the solution of the above equations in order to arrive at the lowest value of predetermined gain, G, consistent with the assurance of an eventual surge condition.

Figures 9, 10, 11, 12:
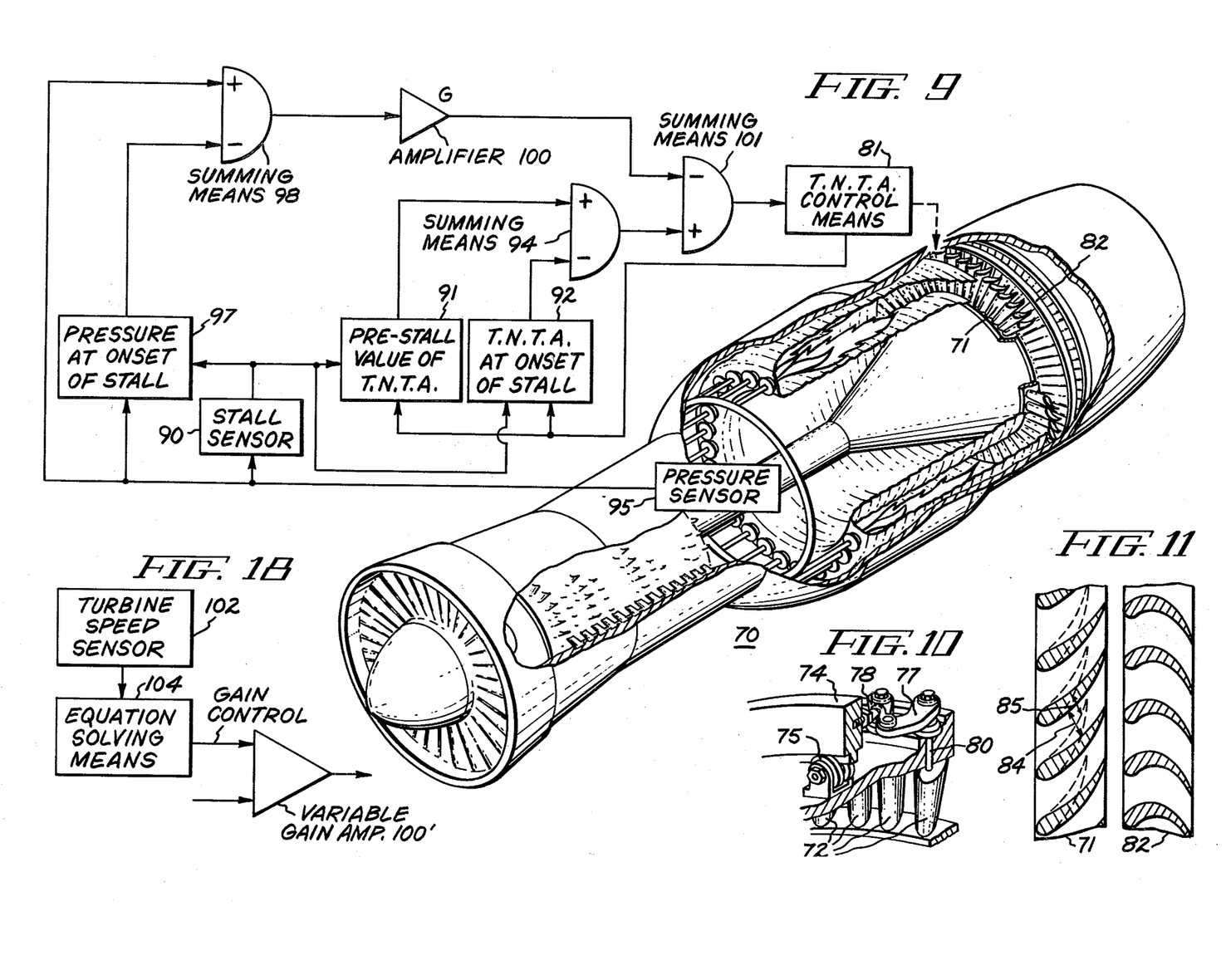
FIG. 9 is a simplified, perspective view, partially broken away, of one form of a gas turbine engine along with a a block diagram of an alternative means for implementing the present invention.
FIGS. 10–11 are detail views of a variable turbine guide vane assembly of the gas turbine engine of FIG. 9.
FIGS. 12–14 are graphs illustrating various parameters of a gas turbine engine that does not utilize the present invention and that consequently goes into a non-surging stall mode after the onset of a stall.
Figure 12:
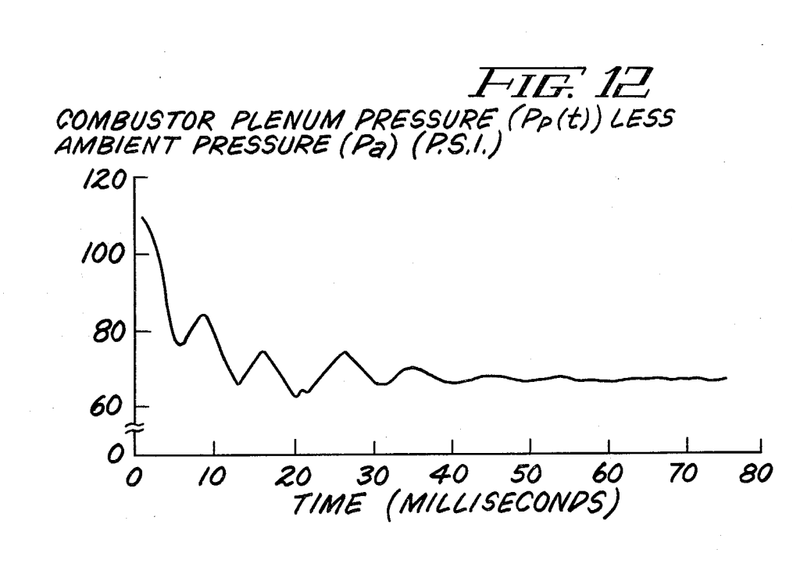

Turning to FIG. 9, there is shown a simplified view of one form of a gas turbine engine 70 along with a block diagram of a further means for implementing the present invention. The gas turbine engine 70 is substantially similar to the gas turbine engine 20, described above, except that the engine 70 has a turbine guide vane assembly 71 designed with a variable turbine nozzle throat area (hereinafter, simply "T.N.T.A."). Turbine guide vane assemblies having variable T.N.T.A.'s are known in the art. In one possible implementation, the turbine guide vane assembly 71 is provided with apparatus for rotating each of the individual vanes thereof. A suitable apparatus for rotating such vanes is illustrated in a simplified fashion in FIG. 10.

Referring to FIG. 10, each of the individual vanes 72 of the turbine guide vane assembly 71 is able to move about its respective vertical axis, as viewed in FIG. 10. This rotation is controlled by a rotatable ring 74 which rolls on a roller 75. The ring 74 imparts motion to doglegs 77 and 78, which then impart rotational motion to the individual vanes through respective shafts such as shaft 80. The position of the rotatable ring 74 relative to the individual guide vanes 72 is controlled by a T.N.T.A. control means 81 shown in the block diagram of FIG. 9.

A better appreciation for the variability of the T.N.T.A. of the turbine guide vane assembly 71 can be had by considering the "stage" diagram of FIG. 11. The turbine guide vanes on the left of FIG. 11 represent the turbine guide vane assembly 71, and the turbine blades on the right of FIG. 11 represent a rotating turbine blade assembly 82 which is adjacent the turbine guide vane assembly 71 and downstream therefrom. When the guide vanes of the turbine guide vane assembly 71 are in the position indicated by the solid line diagram therefor, a turbine nozzle throat having a width as indicated by an arrow 84 is provided. Where the guide vanes of the turbine guide vane assembly 71 occupy the position shown in the dashed lines in FIG. 11, a turbine nozzle throat as indicated by an arrow 85 is provided. It can be observed that the arrow 85 is shorter than the arrow 84. Since the T.N.T.A. directly depends upon the distance separating adjacent guide vanes of the turbine guide vane assembly 71, it can be appreciated that the T.N.T.A. is a variable parameter of the gas turbine engine 70. It is conventional knowledge that, in unstalled operation of the compressor, a decrease in the T.N.T.A. decreases the weight flow rate through the compressor thereby increasing the pressure ratio developed by it and increasing the overall power output of the gas turbine engine 70.

The T.N.T.A. control means 81 of FIG. 9 is suitably implemented in a conventional manner for operation in the absence of a stall. When a stall exists, the T.N.T.A. control means 81 serves to modulate the T.N.T.A. substantially in phase with an electrical modulation signal produced by a summing means 101. The T.N.T.A. control means 81 also provides an electrical output signal indicative of the setting of the T.N.T.A. A stall sensor 90 determines the onset of a stall and produces an electrical output signal in response thereto. With the gas turbine 70 conforming to the specific gas turbine parameters set forth above, the criterion for determining the onset of a stall is suitably the same as that set forth for the stall sensor 43 of FIG. 1. A means 91 monitors the setting of the T.N.T.A. in response to the output signal of the T.N.T.A. control means 81, delays this signal for a period of time in excess of about 25 milliseconds, and outputs the resultant delayed signal after the onset of a stall, which is sensed by the means 91 in response to the output of the stall sensor 90. Such delayed output signal from the means 91 represents a pre-stall value of the T.N.T.A. prior to the occurrence of a stall-inducing agent. At the onset of a stall as indicated by an output signal from the stall sensor 90, means 92 stores and continually supplies to a negative input of a summing means 94 a signal representative of the T.N.T.A. at the onset of a stall. The summing means 94 subtracts the output signal of the means 92 representing the value of T.N.T.A. at the onset of a stall from the output signal of the means 91 representing the pre-stall value of the T.N.T.A. and provides a time-constant output signal to be used in determining the T.N.T.A. after the onset of the stall. The reason for so "subtracting" the T.N.T.A. at the onset of a stall from the steady state value of the T.N.T. is to incorporate a prior art corrective action for alleviating a stalled condition in an engine where the relevant stall-inducing agent constitutes an abrupt change in the T.N.T.A. Such prior art corrective action, in other words, comprises increasing the T.N.T.A. after the onset of a stall from the steady state value thereof, if the stall-inducing agent were reducing the T.N.T.A., or vice-versa. The amount of corrective increase or decrease in the T.N.T.A. is typically the same as the amount of decrease or increase in the T.N.T.A. which constituted the stall-inducing agent.

A pressure sensor 95 measures the pressure of the combustor plenum of the gas turbine engine 70. Details of the pressure sensor 95 are suitably the same as those of the pressure sensor 42 of FIG. 1, discussed above. The pressure sensor 95 produces an output signal representing the combustion plenum pressure. In response to this output signal, a means 97 during stall stores a signal representing the value of the combustor plenum pressure at the onset of the stall and supplies this time-constant signal to the negative input of a summing means 98.

The summing means 98 subtracts the time-constant signal supplied by the means 97 from the signal supplied by the pressure sensor 95, and supplies a time-varying output signal to an amplifier 100. This time-varying signal represents the time-varying component of the combustor plenum pressure. This time-varying signal is amplified by the amplifier 100 having a predetermined gain, G, and which supplies an output amplified signal to the negative input of a summing means 10.

The summing means 101 subtracts the amplified signal from the amplifier 100, representing the time-varying component of the combustor plenum pressure, from the output signal of the summing means 94, representing a time-constant component of the T.N.T.A. The output signal of the summing means 101 constitutes a modulation signal which the T.N.T.A. control means 81 uses to modulate the T.N.T.A. after the onset of a stall. Thus, it can be said that the time-varying component of the variable parameter comprising *decrease* in T.N.T.A. is modulated substantially in phase with the time-varying component of the combustor plenum pressure. Additionally, it can be said that the amplitude of the time-varying component of the decrease in T.N.T.A. bears a predetermined relation of proportionality to the time-varying component of the combustor plenum pressure.

FIGS. 12-17 are graphs illustrating selected parameters of the gas turbine engine system of FIG. 2. These graphs are based upon the simultaneous solving of the above five differential equations for a specific gas turbine engine having the same parameters as set forth above for FIGS. 3-8. A study of the graphs of FIGS. 12-17 will indicate how to select a suitable value for the predetermined gain, G, of the amplifier 100 of FIG. 9.

Figure 13:
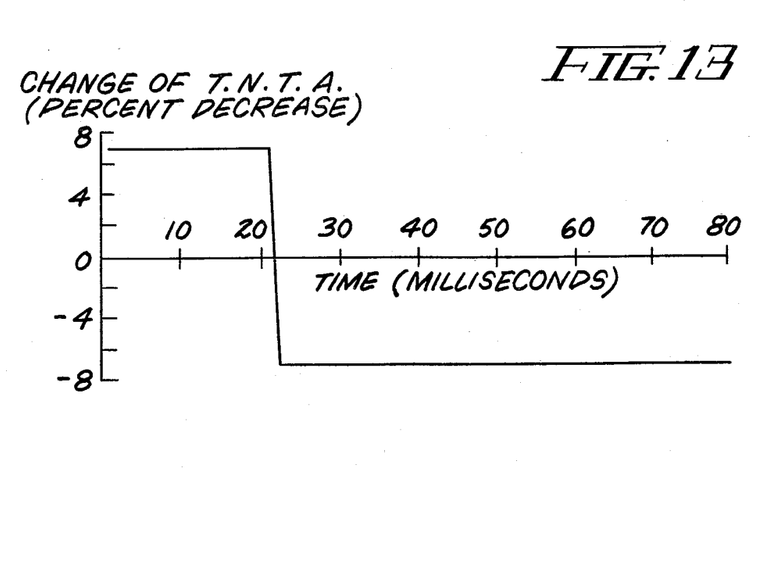
Figure 14:
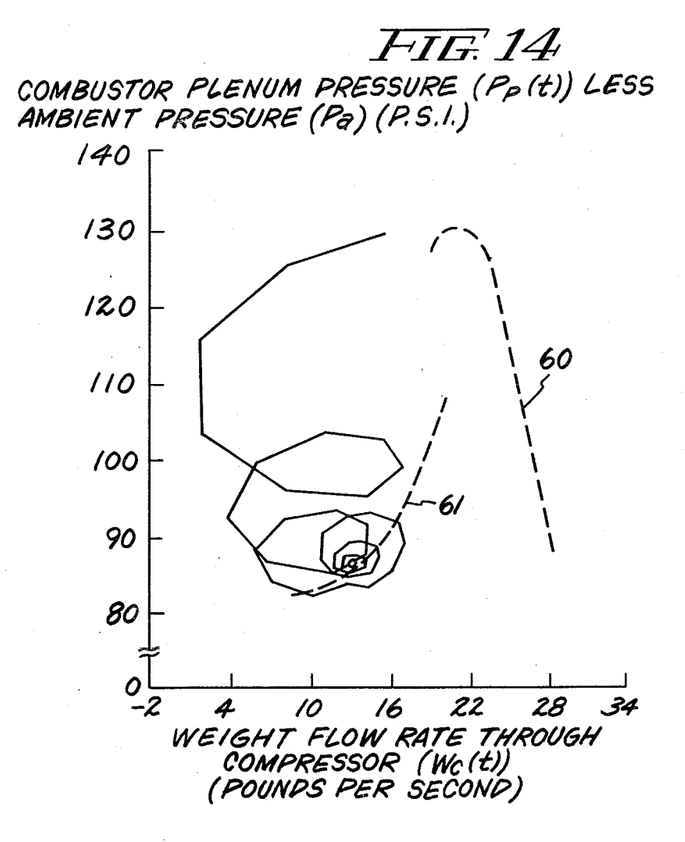

To put the operation of the present invention into a sharper perspective, FIGS. 12-14 illustrate various parameters of a gas turbine engine that goes into a stalled condition due to an abrupt decrease in the T.N.T.A. of the engine at time "0" and wherein only the prior art corrective action of increasing the T.N.T.A. is undertaken.

Turning to FIG. 12, the Combustor Plenum Pressure ($P_p(t)$) Less Ambient Pressure ($P_a$) ("Plenum Pressure") is observed to drop rapidly in the first several milliseconds after time "0".

The onset of a stall, according to the criterion set forth above, occurs at approximately 4 milliseconds. FIG. 13 illustrates the stall-inducing agent which caused the engine stall: that is, T.N.T.A. was decreased by 7 percent, presumably in an attempt to rapidly accelerate the engine. At approximately 22 milliseconds, the prior art corrective action of increasing the T.N.T.A. by the same magnitude as that of the stall-inducing agent is undertaken. However, it is observed in FIG. 12 that the Pressure continues to go through a rapidly decaying oscillation. This is characteristic of a non-surging stall.

The existence of a non-surging engine stall is clearly illustrated in FIG. 14. The compressor performance curve (the solid line) originally is on the steady state, unstalled compressor characteristic 60. Thereafter, the compressor performance curve moves rapidly to the left of the upper portion of the characteristic 60 and starts spiralling in a counter-clockwise fashion until it arrives at the steady state, stalled compressor characteristic 61. It can be appreciated that the compressor performance curve never returns to the unstalled characteristic 60, and, therefore, fails to define a surge condition.

Figure 15:
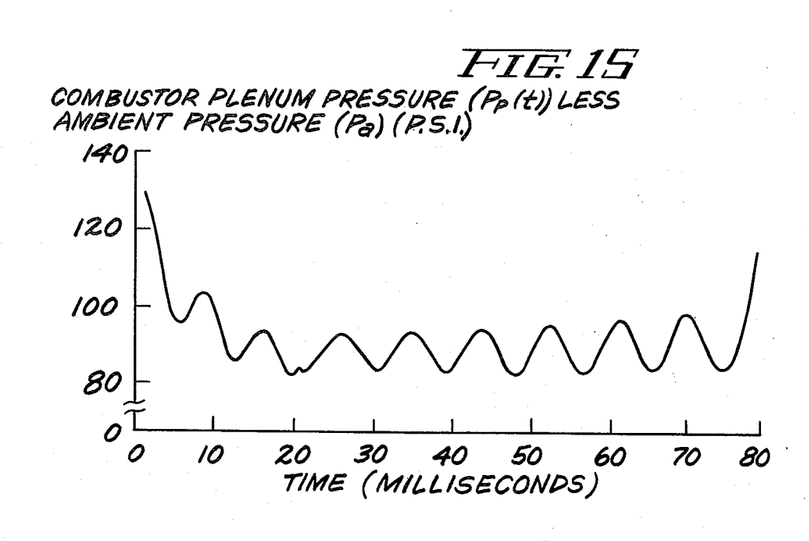
FIGS. 15–17 are graphs illustrating various parameters of a gas turbine engine that enters a stall mode, wherein a surge condition is promoted in accordance with the present invention.
Figure 16:
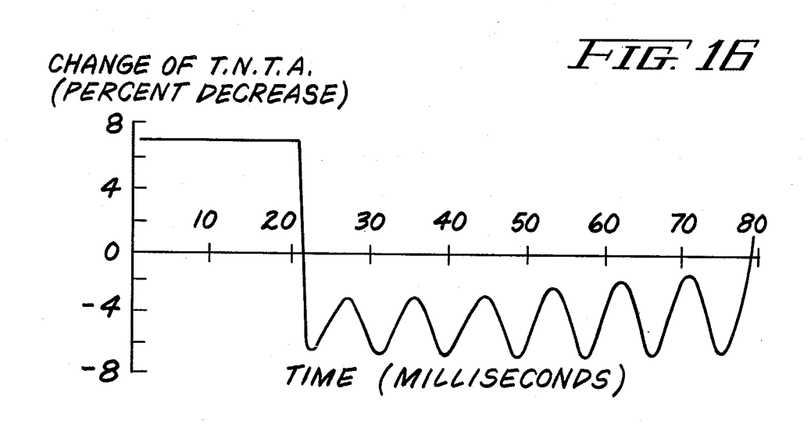
Figure 17:
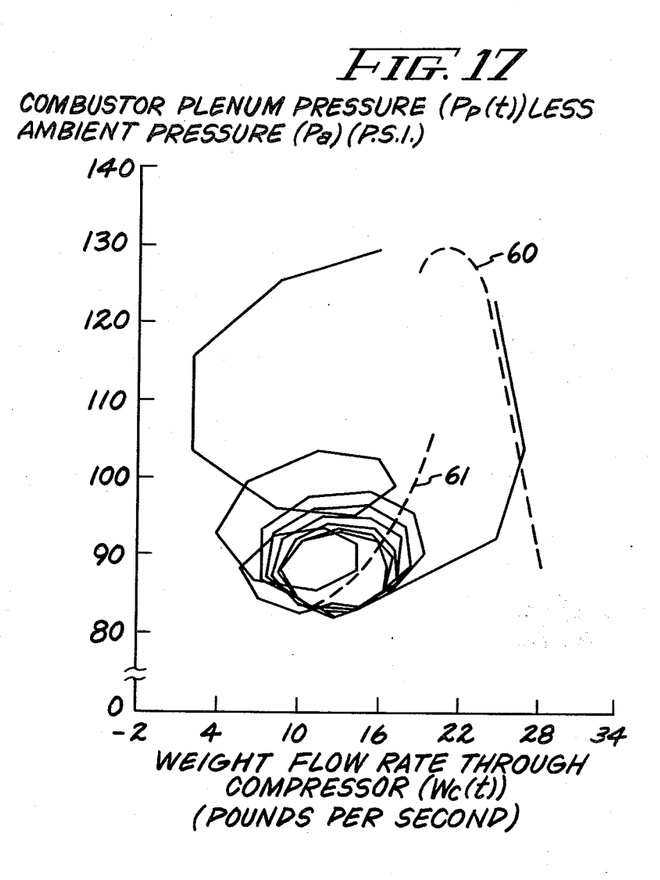

By incorporating the present invention in the gas turbine engine 70 of FIG. 9 the engine 70 assumes a surge condition after going into a stall as is illustrated by the graphs of FIGS. 15-17. Both graphs 15 and 16 are the same as the foregoing graphs 12 and 13 up until approximately 22 milliseconds. After this point in time, the T.N.T.A. is modulated as indicated in FIG. 16. That is to say the time-varying component of the decrease of the T.N.T.A. is modulated substantially in phase with the time-varying component of the combustor plenum pressure as represented by the Pressure curve in FIG. 15.

By comparing FIG. 13 with FIG. 16, it can be appreciated that the present invention has utilized the prior art corrective action, as illustrated in FIG. 13 and discussed above, for alleviating the stalled condition. (The selection of the time-constant component of the T.N.T.A. at 22 milliseconds is accomplished in the block diagram of FIG. 9 by the means 91, 92, and 94). The present invention, however, need not incorporate the prior art corrective action. Rather, the time-constant component of the T.N.T.A. can be selected, for example, to equal the value of the T.N.T.A. prior to the occurrence of a stall-inducing agent. (This would require that means 91, 92 and 94 in FIG. 9 be replaced by a means that would be analogous to the means 53 in FIG. 1, which means 53 produces a pre-stall value of the variable parameter of fuel flow).

It can be appreciated from FIG. 16 that the present invention becomes effective somewhat after the onset of a stall in accordance with the criterion therefore set forth above. In terms of the block diagram of FIG. 9, this means that the modulation signal produced by the summing means 101 achieves effective control over the T.N.T.A. means 81 at about 22 milliseconds for the specific example described by the graph of FIG. 6. The engine 70 nonetheless eventually assumes a surge condition. This situation underscores the fact that the precise moment of determining an onset of a stall is not crucial for the purposes of the present invention. It is only crucial that a stall be detected or determined.

The fact that the engine described by the foregoing FIGS. 15 and 16 eventually assumes a surge condition is made clearly apparent in FIG. 17. In FIG. 17, the compressor performance curve (the solid line) initially is on the steady state, unstalled compressor characteristic 60. Thereafter, the compressor curve moves quickly to the left of the upper portion of the characteristic 60, and then spirals in a counter-clockwise fashion for several cycles until eventually coinciding again with the steady state, unstalled characteristic 60. Such coinciding of the compressor performance curve on the characteristic 60 defines the occurrence of a surge condition.

In arriving at a suitable predetermined gain, G, for the amplifier 100 of FIG. 9, one should use a first function of time for the T.N.T.A. corresponding to a first value of the predetermined gain, G, in the simultaneous solving of the five differential equations set forth above. Second and further functions of time for T.N.T.A. as necessary should then be used in predetermining a suitable value of the predetermined gain, G, for ensuring the eventual occurrence of a surge condition, as discussed above.

It is desirable to minimize the predetermined gain, G, in order to substantially minimize structural stress imposed on the gas turbine engine. Accordingly, different values of the T.N.T.A. should be used in the solution of the above equations in order to arrive at the lowest value of predetermined gain, G, consistent with the assurance of an eventual surge condition.

In a further alternative embodiment of the present invention, the amplifier 100 of FIG. 9 is replaced by the variable gain amplifier 100' of FIG. 18. In FIG. 18, the variable gain amplifier 100' has a gain control input unlike the amplifier 100 of FIG. 9. A turbine speed sensor 102 senses the rotational speed of the rotating turbine of the engine 70 and provides this information to an equation solving means 104. The equation solving means 104 suitably comprises a digital computer with which to solve the five differential equations set forth above and includes means to supply a gain control signal to the gain control input of the variable gain amplifier 100'. Accordingly, the gain of the variable gain amplifier 100' can be minimized consistent with the assurance of an eventual surge condition in the gas turbine engine 70 when stalled. The minimization of the gain of the amplifier 100' serves to minimize the amplitude of the time-varying component comprising decrease in T.N.T.A. whereby the structural stress imposed on the engine 70 is likewise minimized.

From the foregoing description of the present invention, it will be appreciated that the invention attains various, important objects. For example, a method and apparatus for promoting a surge condition in a stalled gas turbine engine is provided. Such method and apparatus is capable of being incorporated in existing engines through retrofitting such engines. Additionally, the method and apparatus is calculated to minimize structural stress imposed on a gas turbine engine due to the surge condition which is promoted thereon.

Figure 19:
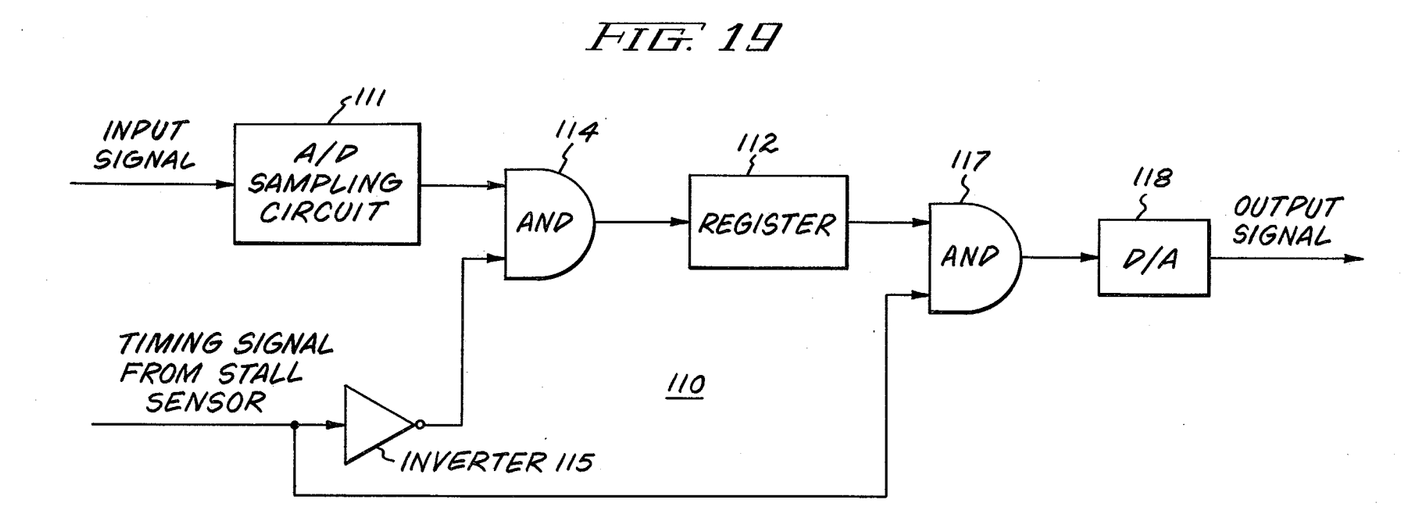
FIG. 19 is a block diagram illustrating a preferred implementation of various means of FIGS. 1 and 9 shown in block diagram form therein.

FIG. 19 is a block diagram illustrating a preferred implementation of any of the following means: the means 47 of FIG. 1, the means 92 of FIG. 9, and the means 97 of FIG. 9. Each of these means receives an output signal from respective stall sensor 43 or 90 indicating the onset of a stall; this output signal can thus be said to constitute a timing signal indicating a stall onset. Each of these means also receives an input signal (for example, the means 47 receives an input signal from the pressure sensor 42) and supplies an output signal to a further device (for example, the means 47 supplies an output signal to the summing means 50). Accordingly, the block diagram circuit 110 of FIG. 19 is illustrated as receiving an input signal and a timing signal from a stall sensor, and as supplying an output signal.

An analog-to-digital (A.D.) sampling circuit 111 receives the input signal which is an analog signal and samples it periodically. For the specific gas turbine engines described above, a suitable sampling period is 0.5 milliseconds. In general, the smaller a gas turbine engine is, the higher the frequencies of interest are, and, thus, the shorter a suitable sampling period is. The A.D. sampling circuit 111 supplies an output, digital signal, representing the sampled value of the input signal, after each sampling to a register 112 via an AND gate 114. The AND gate 114, in conjunction with an INVERTER gate 115, enables transmission of data from the A.D. sampling circuit 111 to the register 112 only prior to an onset of a stall, while the timing signal from the stall sensor has a logic "zero" value. The data in the register 112 is thus updated every sampling period prior to stall onset.

An AND gate 117 blocks or disables transmission of data from the register 112 to a digital-to-analog converter ("D.A.C.") 118 prior to the onset of a stall. At the onset of a stall when the timing signal from the stall sensor assumes a logic "one" value, the AND gate 117 enables transmission of data from the register 112 to the D.A.C. 118. At the same time, the AND gate 114 blocks transmission of data from the A.D. sampling circuit 111 to the register 112, thereby causing the register 112 to store data representing the input signal at the onset of a stall. As a consequence of this fact, the D.A.C. 118 receives a time-constant data from the register 112 after stall onset, and supplies a time-constant output signal equivalent to the input signal at stall onset.

The register 112 suitably comprises a 12-bit register for the specific gas turbine engines described above. Transmission of digital data with the block diagram circuit 110 is preferably accomplished in parallel fashion, although only single transmission lines are illustrated.

Figure 20:
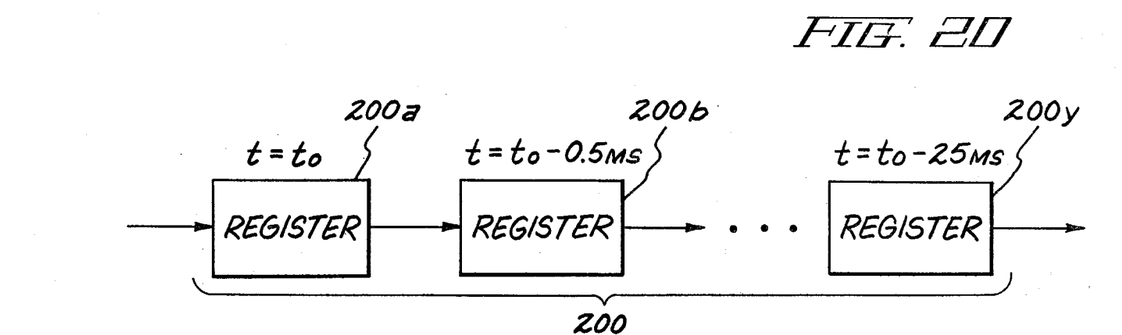
FIG. 20 is a block diagram illustrating a series of registers which can replace the register of FIG. 19 and thereby implement various further means of FIGS. 1 and 9 shown in block diagram form therein.

By replacing the single register 112 of the circuit 110 of FIG. 18 with the series of registers 200 illustrated in FIG. 20, the modified circuit 110 suitably implements any of the following means: the means 53 of FIG. 1 and the means 91 of FIG. 9. In FIG. 20 the series of registers 200, numbering 50 altogether, initially has no data in them. The register 200a then receives data representing a sampled value of the input signal from the A.D. sampling circuit 111. After the next sampling period, the data that was in the register 200a is shifted to the register 200b, and the register 200a receives the new data from the A.D. sampling circuit 111. After 50 sampling periods have elapsed (25 milliseconds for the circuit described), the register 200y contains data which is delayed by 25 milliseconds with respect to the data in the register 200a. Thus, after the initial 25 millisecond operation of the modified circuit 110, at any given time t="$t_o$", the data in the register 200y represents a sampled value of the input signal delayed by 25 milliseconds, or, in other words, a sampled value at time $t=t_o-25$ milliseconds. Accordingly, after a stall onset, the modified circuit 110 supplies a time-constant output signal representing a value of the input signal delayed by 25 milliseconds, or, in other words, a pre-stall value thereof.

While specific embodiments of the present invention have been shown and described, it will be obvious to those skilled in the art that various changes and modifications may be made without departing from the invention in its broader aspects; and, therefore, it is intended that the appended claims cover all such changes and modifications as fall within the true spirit and scope of the invention.

What is claimed as my invention and desired to be secured by Letters Patent of the United States is:

1. A method of promoting a surge condition in a stalled gas turbine engine having a combustor plenum disposed between a compressor and a turbine, comprising:
    (a) monitoring pressure in said combustor plenum of said gas turbine engine;
    (b) determining an onset of a stall in said gas turbine engine; and
    (c) modulating a time-varying component of a first operating parameter of said engine substantially in phase with a time-varying component of said combustor plenum pressure in response to and only after said onset of said stall, whereby a surge condition is promoted in said gas turbine engine.

2. The method of claim 1 wherein said modulating a time-varying component of said first operating parameter comprises modulating this time-varying component in such manner that it bears a relation of proportionality to the amplitude of the time-varying component of said combustor plenum pressure.

3. The method of claim 1 further comprising:
    (a) monitoring said first operating parameter and determining a pre-stall value thereof; and
    (b) providing said first operating parameter with a time-constant component after said stall onset, said time-constant component having a value within about 25 percent of said pre-stall value thereof.

4. The method of claim 3 wherein said monitoring said first operating parameter and determining a pre-stall value thereof comprises determining a pre-stall value of said first operating parameter constituting a value thereof existing prior to the occurrence of a stall-inducing agent that causes said stall.

5. The method of claim 1 wherein said first operating parameter comprises the rate of fuel flow to said combustor plenum of said gas turbine engine.

6. The method of claim 1 wherein said first operating parameter comprises the rate of heat release in said combustor plenum of said gas turbine engine.

7. The method of claim 6 wherein said modulating a time-varying component of the rate of heat release comprises modulating a time-varying component of the rate of fuel flow to said combustor plenum.

8. The method of claim 6 wherein said modulating a time-varying component of the rate of heat release comprises modulating the rate of fuel flow to said combustor plenum with a control signal having a phase effectively advanced in time with respect to the phase of the time-varying component of said combustor plenum pressure so as to compensate for the delay between the rate of fuel flow and the rate of heat release.

9. The method of claim 5 or 7 further comprising limiting the rate of fuel flow to substantially a maximum rated fuel flow of said gas turbine engine after said onset of said stall.

10. The method of claim 5 or 6 wherein said modulating a time-varying component of said first operating parameter comprises modulating this time-varying component in such manner that it bears a relation of proportionality to the amplitude of the time-varying component of said combustor plenum pressure.

11. The method of claim 10 wherein said modulating a time-varying component of said first operating parameter comprises modulating this time-varying component in such manner that it is also proportional to a pre-stall value of said first operating parameter.

12. The method of claim 10 wherein said modulating a time-varying component of said first operating parameter comprises modulating this time-varying component in such manner that it is also proportional to a value of said first operating parameter existing prior to the occurrence of a stall-inducing agent that causes said stall.

13. The method of claim 1 wherein:
    (a) said gas turbine engine includes a variable turbine nozzle throat area; and
    (b) said first operating parameter comprises a decrease of said turbine nozzle throat area.

14. The method of claim 13 wherein said modulating a time-varying component of said first operating parameter comprises modulating this time-varying component in such manner that it bears a relation of proportionality to the amplitude of the time-varying component of said combustor plenum pressure.

15. The method of claim 14 wherein the amplitude of the time-varying component of said first operating parameter is dependent on a second operating parameter of said gas turbine engine.

16. The method of claim 15 wherein said second operating parameter comprises turbine speed of said gas turbine engine.

17. The method of claim 1 wherein said modulating a time-varying component of said first operating parameter comprises modulating this time-varying component in such manner that it bears a relation of proportionality to the amplitude of the time-varying component of said combustor plenum pressure, said relation being selected to substantially minimize the amplitude of said time-varying component of said first operating parameter so as to minimize structural stress imposed on said gas turbine engine due to said modulation of said first operating parameter.

18. The method of claim 17 wherein said relation of proportionality is dependent upon a second operating parameter of said gas turbine engine.

19. The method of claim 18 wherein said second operating parameter comprises turbine speed of said gas turbine engine.

20. An apparatus for promoting a surge condition in a stalled gas turbine engine having a combustor plenum disposed between a compressor and a turbine, comprising:
    (a) means for monitoring pressure in said combustor plenum of said gas turbine engine;
    (b) means for determining an onset of a stall in said gas turbine engine; and (c) means for modulating a time-varying component of a first operating parameter of said engine substantially in phase with a time-varying component of said combustor plenum pressure in response to and only after said onset of said stall, whereby a surge condition is promoted in said gas turbine engine.

21. The apparatus of claim 20 wherein said means for modulating a time-varying component of said first operating parameter comprises means for modulating this time-varying component in such manner that it bears a relation of proportionality to the amplitude of the time-varying component of said combustor plenum pressure.

22. The apparatus of claim 20 further comprising:
(a) means for monitoring said first operating parameter and determining a pre-stall value thereof; and
(b) means for providing said first operating parameter with a time-constant component after said stall onset, said time-constant component having a value within about 25 percent of said pre-stall value thereof.

23. The apparatus of claim 22 wherein said means for monitoring said first operating parameter and determining a pre-stall value thereof comprises means for determining a pre-stall value of said first operating parameter constituting a value thereof existing prior to the occurrence of a stall-inducing agent that causes said stall.

24. The apparatus of claim 20 wherein said first operating parameter comprises rate of fuel flow to said combustor plenum of said gas turbine engine.

25. The apparatus of claim 20 wherein said first operating parameter comprises rate of heat release in said combustor plenum of said gas turbine engine.

26. The apparatus of claim 25 wherein said means for modulating a time-varying component of said heat release comprises means for modulating a time-varying component of the rate of fuel flow to said combustor plenum.

27. The apparatus of claim 25 wherein said means for modulating a time-varying component of the rate of heat release comprises means for modulating the rate of fuel flow to said combustor plenum with a control signal having a phase effectively advanced in time with respect to the phase of the time-varying component of said combustor plenum pressure so as to compensate for the delay between the rate of fuel flow and the rate of heat release.

28. The apparatus of claim 24 or 26 further comprising means for limiting the rate of fuel flow to substantially a maximum rated fuel flow of said gas turbine engine after said onset of said stall.

29. The apparatus of claim 24 or 26 wherein said means for modulating a time-varying component of said first operating parameter comprises means for modulating this time-varying component in such manner that it bears a relation of proportionality to the amplitude of the time-varying component of said combustor plenum pressure.

30. The apparatus of claim 29 wherein said means for modulating a time-varying component of said first operating parameter comprises means for modulating this time-varying component in such manner that it is also proportional to a pre-stall value of said first operating parameter.

31. The apparatus of claim 29 wherein said means for modulating a time-varying component of said first operating parameter comprises means for modulating this time-varying component in such manner that it is also proportional to a value of said first operating parameter existing prior to the occurrence of a stall-inducing agent that causes said stall.

32. The apparatus of claim 20 wherein:
(a) said gas turbine engine includes a variable turbine nozzle throat area; and
(b) said first operating parameter comprises a decrease of said turbine nozzle throat area.

33. The apparatus of claim 32 wherein said means for modulating a time-varying component of said first operating parameter comprises means for modulating this time-varying component in such manner that it bears a relation of proportionality to the amplitude of the time-varying component of said combustor plenum pressure.

34. The apparatus of claim 33 wherein the amplitude of the time-varying component of said first operating parameter is dependent on a second operating parameter of said gas turbine engine.

35. The apparatus of claim 34 wherein said second operating parameter comprises turbine speed of said gas turbine engine.

36. The apparatus of claim 20 wherein said means for modulating a time-varying component of said first operating parameter comprises means for modulating this time-varying component in such manner that it bears a relation of proportionality to the amplitude of the time-varying component of said combustor plenum pressure, said relation being selected to substantially minimize the amplitude of said time-varying component of said first operating parameter so as to minimize structural stress imposed on said gas turbine engine due to said modulation of said first operating parameter.

37. The apparatus of claim 36 wherein said relation of proportionality is dependent upon a second operating parameter of said gas turbine engine.

38. The apparatus of claim 37 wherein said second operating parameter comprises turbine speed of said gas turbine engine.

* * * * *